United States Patent [19]

Yoneyama et al.

[11] Patent Number: 5,253,547
[45] Date of Patent: Oct. 19, 1993

[54] BALANCER DEVICE FOR IN-LINE ENGINE

[75] Inventors: Sachkio Yoneyama; Hisao Ohkawa, both of Kanagawa; Shisei Kai, Tokyo; Takeshi Houkita, Kanagawa, all of Japan

[73] Assignee: Nissan Motor Co., Ltd., Yokohama, Japan

[21] Appl. No.: 870,907

[22] Filed: Apr. 20, 1992

[30] Foreign Application Priority Data

Apr. 30, 1991 [JP] Japan .................. 3-098869

[51] Int. Cl.$^5$ .................. F16F 15/10; F16H 37/06
[52] U.S. Cl. .................. 74/604; 123/192.2
[58] Field of Search .............. 74/604, 603; 123/192.1, 123/192.2

[56] References Cited

U.S. PATENT DOCUMENTS

| | | | |
|---|---|---|---|
| 2,838,957 | 6/1958 | Johnson | 74/604 |
| 3,710,774 | 1/1973 | Weseloh et al. | 74/604 X |
| 4,125,036 | 11/1978 | Nakamura et al. | 74/604 |
| 4,377,992 | 3/1983 | Zeilinger et al. | 74/604 X |
| 4,480,607 | 11/1984 | Tsai et al. | 74/604 X |
| 4,508,069 | 4/1985 | Dobler et al. | 74/604 X |
| 4,523,553 | 6/1985 | Backlund | 74/604 X |
| 4,690,111 | 9/1987 | Kohno et al. | 74/604 X |
| 4,819,505 | 4/1989 | Takubo et al. | 74/604 X |
| 4,966,042 | 10/1990 | Brown | 74/604 X |
| 5,044,333 | 9/1991 | Fuchigami et al. | 74/604 X |

FOREIGN PATENT DOCUMENTS 63-167145 7/1988 Japan .

Primary Examiner—Leslie A. Braun
Assistant Examiner—Andrea Pitts
Attorney, Agent, or Firm—Foley & Lardner

[57] ABSTRACT

A balancer device installed to an in-line engine comprises a balance shaft which includes first and second journals at which the balance shaft is supported through first and second bearings. The first bearing is disposed near the front side of the engine and set in a retainer for rotatably fixing the balance shaft. The second bearing is disposed near a generally center portion in the axial direction of the crankshaft and secured to a cylinder block. A pair of unbalance portions are disposed near the second journal. The diameter of the first journal is formed smaller than that of the second journal to suppress the friction loss of the first journal.

6 Claims, 3 Drawing Sheets

BALANCER DEVICE FOR IN-LINE ENGINE

BACKGROUND OF THE INVENTION

1. Field of the Invention

The present invention relates to a balancer device of an in-line engine, and more particularly to a balancer device in which a balance shaft is assembled in a cylinder block of the engine.

2. Description of the Prior Art

It is well known that a balancer device has been used for an in-line engine in order to suppress the vibration due to the reciprocating movements in the engine. Such a balancer device is disclosed, for example, in Japanese Patent Provisional Publication No. 63-167145, in which the balancer device is equipped in an in-line four cylinder engine. First and second balance shafts are arranged to be generally parallel with a crankshaft of the engine and to be opposite to each other relative to the crankshaft. The first and second balance shafts are rotated at twice the rotating speed of the crankshaft but rotating reversely with each other. The first balance shaft is rotated in the same direction as the crankshaft is rotated, and the second balance shaft is rotated in the reverse direction of the rotating direction of the crankshaft. Each balance shaft includes a first journal disposed near the front portion of the engine and a second journal disposed near the middle portion of the engine. A pair of unbalance portions are disposed at both sides of the second journal, respectively. The first and second journals are supported to first and second bearings formed to the cylinder block, respectively. The balance shaft is equipped to the cylinder block by being inserted in the direction of the crankshaft axis from the front side of the cylinder block. The balance shaft is shaped such that the diameter of the first journal is larger than that of the second journal and the diameter of the second journal is larger than twice the radius of the unbalance portions.

However, it is preferable that the diameter of the first journal is smaller than that of the second journal since the second journal receives a load greater than the first journal does.

SUMMARY OF THE INVENTION

It is an object of the present invention to provide an improved balancer device in which a balance shaft is easily attached to the cylinder block and is shaped to have a proper journal size.

A balancer device for an internal combustion engine, in accordance with the present invention, comprises a balance shaft which is rotated according to the rotation of a crankshaft of the engine. The balance shaft includes a first journal portion, a second journal portion and an unbalance portion. The first journal portion is located in the vicinity of the one end of the engine. The unbalance portion is disposed in the vicinity of the second journal portion. A fixing member is fixedly secured to the cylinder block to restrict the sliding movement of the balance shaft in the axial direction. A first bearing portion rotatably supports the first journal portion and is attached to the fixing member. A second bearing portion rotatably supports the second journal portion and is attached to the cylinder block.

With this arrangement, the balance shaft can be easily set to the cylinder block since an inlet portion of the balance shaft is formed considerably larger than the diameter of the first and second journals. Further, since the diameter of the first journal is formed to be smaller than that of the second journal, the sliding friction of the first journal is decreased.

DETAILED DESCRIPTION OF THE INVENTION

Figure 1:
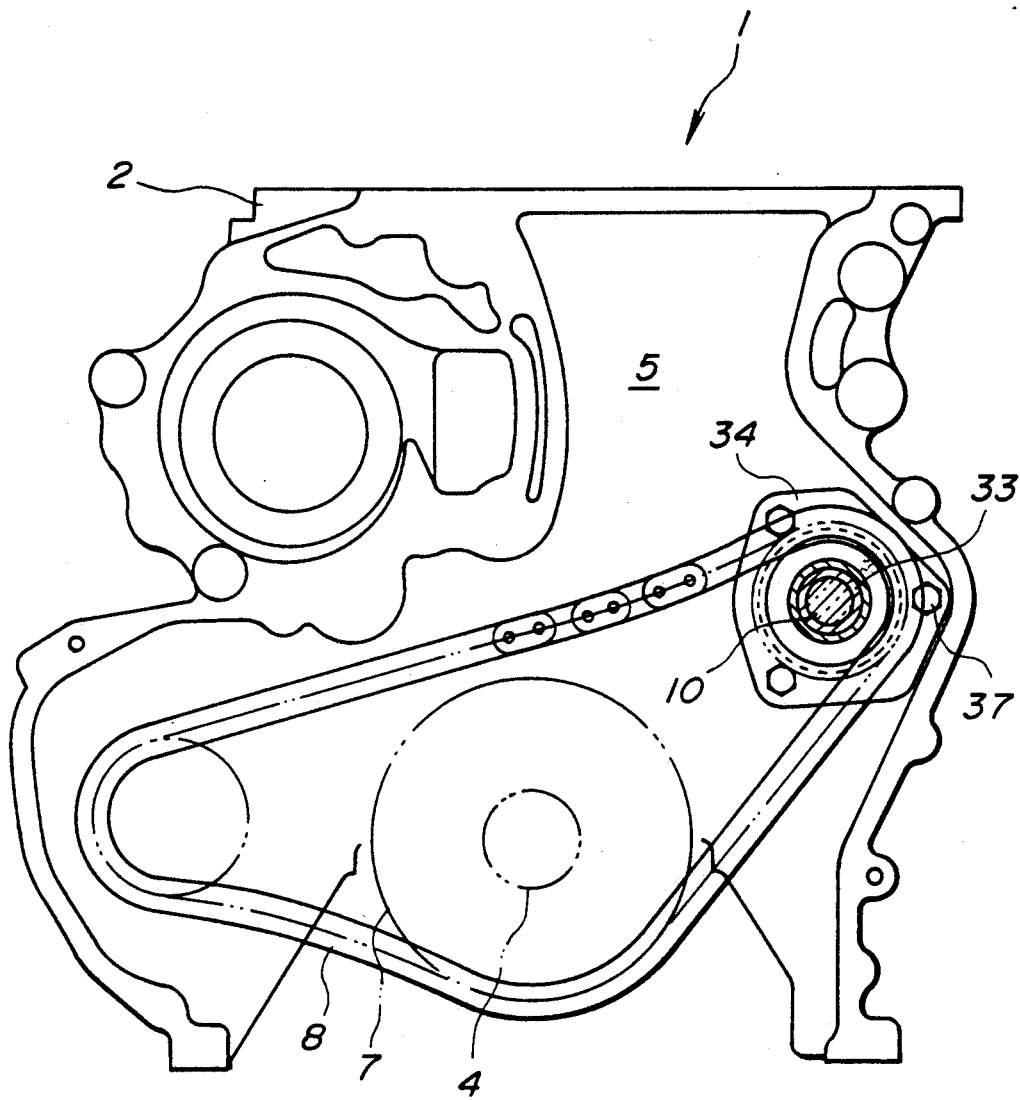
FIG. 1 is a front view showing an essential part of an engine.
Figure 2:
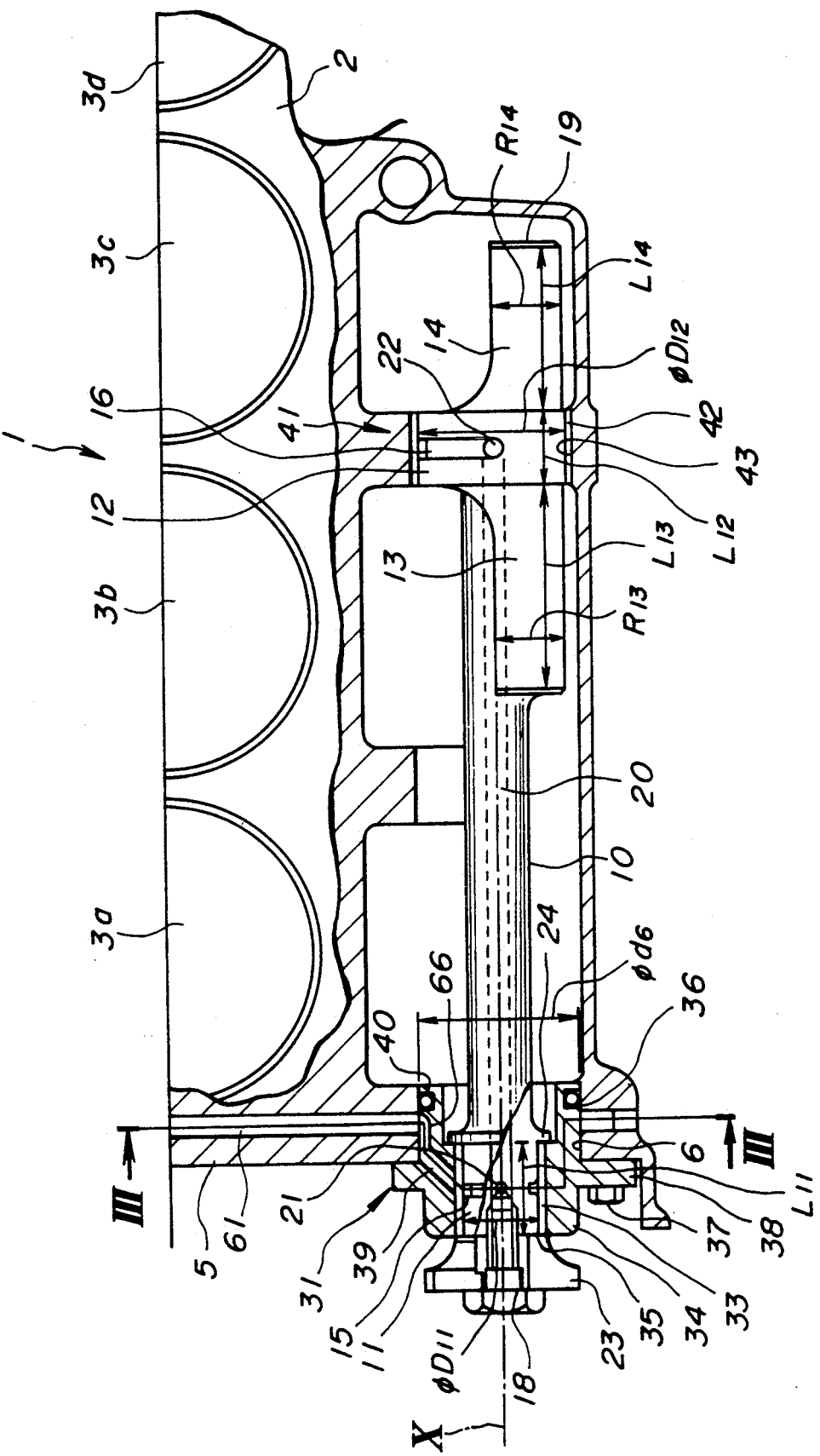
FIG. 2 is a plan view partially in cross section of engine of FIG. 1.
Figure 3:
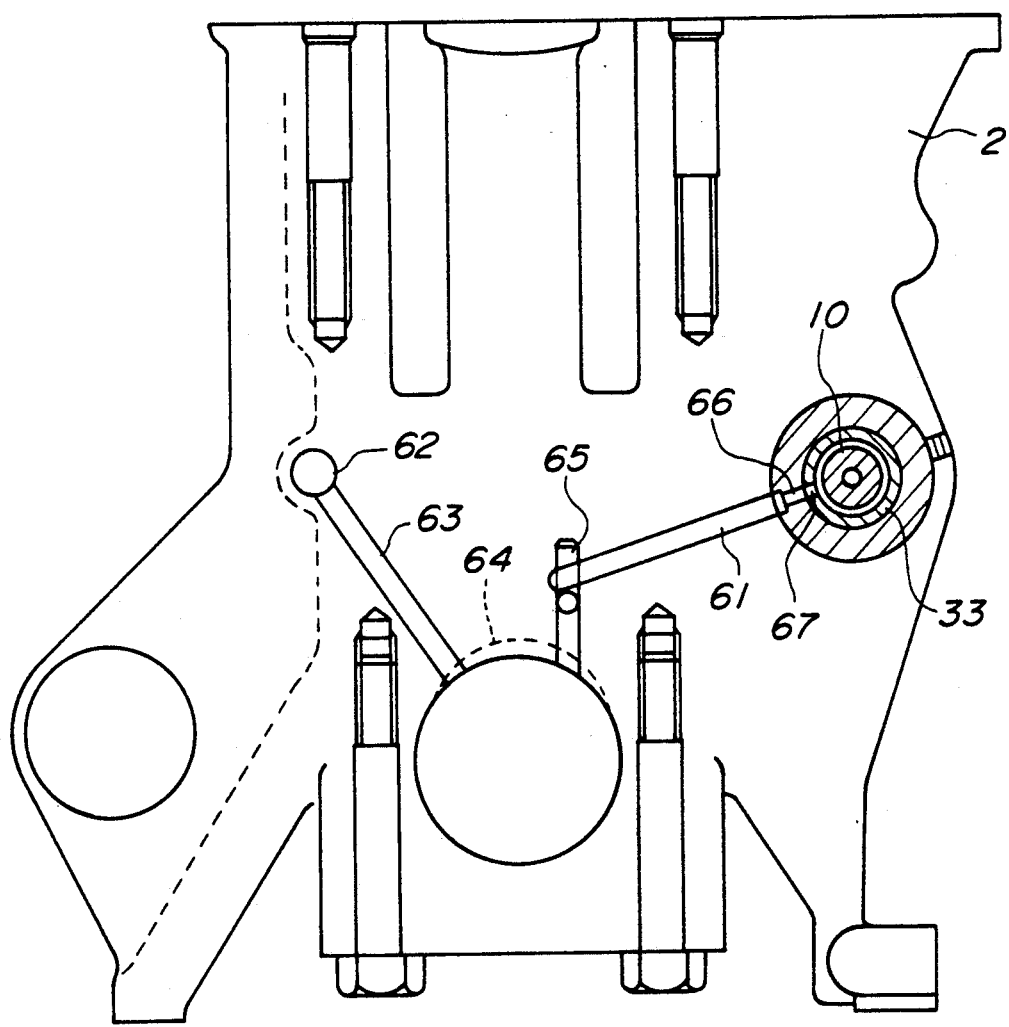
FIG. 3 is a cross-sectional view taken in the direction of the arrows substantially along the line III—III of FIG. 2.

Referring now to FIGS. 1 to 3, there is shown an embodiment of a balancer device applied to a four cylinder in-line engine, in accordance with the present invention.

The engine 1 is provided with a cylinder block 2 in which four cylinders 3a, 3b, 3c, and 3d are formed. Four pistons (no numeral) are reciprocatingly fitted in the cylinders 3a, 3b, 3c, and 3d, respectively. The reciprocations of the pistons are transmitted to a crankshaft (not shown) through connecting rods so that the reciprocating movement is converted into the rotating movement.

A balance shaft 10 is disposed at a laterally side portion in the cylinder block 2 so as to be generally parallel with the crankshaft 4. The balance shaft 10 is formed so as to be inserted into the cylinder block 2 from a front surface 5 of the cylinder block 2 relative to the axial direction of the crankshaft 4. That is to say, the cylinder block 2 functions as a supporting member of the balance shaft 10. The cylinder block 2 is further provided at its upper portion with a cylinder head (not shown) including a valve arrangement for intake and exhaust ports. An oil pan (not shown) is attached to the under portion of the cylinder block 2.

The balance shaft 10 includes a first journal 11 which is disposed in the vicinity of a front end portion of the engine 1, and a second journal 12 is disposed near a generally central portion of the crankshaft 4 in the axial direction of the crankshaft 4. The balance shaft 10 is supported at the first journal 11 by a first bearing 31 installed to the front side of the cylinder block 2 through a retainer 34. The second journal 12 is supported by a second bearing 41 attached to the cylinder block 2. A pair of unbalance portions 13 and 14 are disposed in the vicinity of the second journal 12 so as to be opposite to each other relative to the second journal 12. The first journal 11 is formed to be $\phi D_{11}$ in diameter and $L_{11}$ in length, and is provided at its central portion with a groove 15. Similarly, the second journal 12 is formed to be $\phi D_{12}$ in diameter and $L_{12}$ in length, and is provided at its central portion with a groove 16. The unbalance portion 13, which is disposed between the first journal 11 and the second journal 12, is formed semicircular in cross section, and is $R_{13}$ in radius and $L_{13}$ in length. Another unbalance portion 14, which is disposed to the rear end portion 19 of the balance shaft 10, is similarly formed semicircular in cross section and is $R_{14}$ in radius and $L_{14}$ in length.

The balance shaft 10 includes an oil passage 20 which is formed along the center axis of the balance shaft 10. The oil passage 20 is communicated with the grooves 15 and 16 through communication passages 21 and 22.

The radius $R_{13}$, $R_{14}$ of each unbalance portion 13, 14 is set to be smaller than the radius (a half of the diameter $\phi D_{12}$) of the second journal 12. That is, $R_{13} < \phi D_{12}/2$, and $R_{14} < \phi D_{12}/2$. Further, the radius (a half of the diameter $\phi D_{11}$) of the first journal 11 is set to be smaller than the radius $R_{13}$, $R_{14}$ of each unbalance portion 13, 14. That is, $\phi D_{11}/2 < R_{13}$, and $\phi D_{11}/2 < R_{14}$. A sprocket 23 for driving the balance shaft 10 is attached to the top end portion 18 of the balance shaft 10. On the other hand, the first bearing 31 is constituted by a bearing member 33 made of alloy and is installed to the retainer 34. The retainer 34 includes an inner surface 35 to which the bearing member 33 is press-fitted. A press-fit surface 36 which is of an outer surface of the retainer 34, is press-fitted to the inner surface 6 of an opening formed at the front surface 5 of the cylinder block 2. The retainer 34 is secured at its flange portion 38 to the front surface 5 through liquid-packing, a gasket or the like with bolts 37. The retainer 34 is further provided with an oil-hole 39 through which an oil passage 61 of the cylinder block 2 is communicated with the groove 15. An O-ring 40 is attached to the press-fit surface 36 so as to prevent oil leakage through the press-fit surface 36. The inner diameter $\phi d_6$ of the opening defining surface 6 is set to be sufficiently larger than the diameter $\phi D_{12}$ of the second journal 12. The second bearing 41 is provided with a bearing member 42 made of alloy and is press-fitted to a press-fitted surface 43 of the cylinder block 2.

Furthermore, a second balance shaft (though not shown) is arranged to a generally opposite side of the balance shaft 11 with cylinders between and is rotated at twice the rotating speed of the crankshaft 4.

The manner of operation of the thus arranged balancer device will be discussed hereinafter.

The inner diameter $\phi d6$ of the opening defining surface 6 is set to be sufficiently larger than the diameter $\phi D_{12}$, twice the radius $R_{13}$ of the unbalance portion 13, twice the radius $R_{14}$ of the unbalance portion 14. The first journal portion 11 is set to satisfy the condition that $(D_{11}/2) < R_{13} < (D_{12}/2)$, and $(D_{11}/2) < R_{14} < (D_{12}/2)$. Accordingly, the balance shaft 10 is smoothly inserted into the cylinder block 2 during the engine assembly operation without occurring difficulties such as to hit the opening defining surface 6 of the front surface 5.

After the balance shaft 10 is inserted into the cylinder block 2, the retainer 34 is secured to the front surface 5 so that the bearing 33 made of alloy supports the first journal 11 of the balance shaft 10. Then, the sprocket 23 is attached to the top end portion 18 of the balance shaft 10. The balance shaft 10 is rotated at twice the rotating speed of the crankshaft 4 upon receiving a rotating energy through a drive chains 8 and the sprocket 23. A thrust load receiving portion 24 of the retainer 34 receives a thrust load from the balance shaft 10 in the forward direction of the engine. On the other hand, an inner end surface of the sprocket 23, which is in contact with the end of the balance shaft 10 and the end of the first bearing 33, receives a thrust load from the balance shaft 10 in the rearward direction of the engine.

Since the unbalance portions 13 and 14 are arranged to be disposed in the vicinity of the second journal 12, the eccentric load due to the unbalance portions 13 and 14 is applied to the first and second journals 11 and 12 such that the load to the first journal 11 is smaller than that of the second journal 12.

Furthermore, the diameter $D_{11}$ of the first journal 11 is arranged to be smaller than the diameter $D_{12}$ of the second journal 12 ($D_{11} < D_{12}$). That is to say, the friction loss between the first journal 11 and the first bearing 33 is suppressed at a small value.

Further, since the diameter of the second journal 12 can be set to be further larger, a suitable balance shaft, which has a desired unbalance amount, is served without extending the length $L_{13}$, $L_{14}$ of the unbalance portion 13, 14.

The retainer 34 is arranged such that the inner surface 35 of the retainer 34 outwardly protrudes from the formed surface 5 of the cylinder block 2. Accordingly, the sprocket 23 is disposed so that its load applied portion becomes close to the first bearing 33. This prevents the first bearing 33 from being unequally worn.

Next, the operation of lubrication of the first and second bearings will be discussed hereinafter.

Lubricating oil sucked from the oil pan by an oil pump (not shown) is fed to a main gallery 62 and further fed to a groove 64 formed at a rear portion of a bearing of the crankshaft 4 through the oil passage 63. The oil is supplied to the first sliding surface between the first journal 11 and the first bearing 33 through the oil-hole 39. Further, the oil passed through the first sliding surface is supplied to a second sliding surface between the second journal 12 and the second bearing 42 through a communicating hole 66 defined in the second bearing 33, the groove 15, the first communicating passage 21, the oil passage 20 and the second communicating passage 22.

While the lubricating oil supplied to the grooves 15 and 16 is splashed on the outer circumferential surface of the balance shaft 10 due to the rotation of the balance shaft 10, the splashed oil amount from the first journal 11 is suppressed at a relatively small value as compared with that of the second journal 12 due to the small diameter of the first journal 11. Further, since the clearance between the outer surface of the first journal 11 and the inner surface of the first bearing 33 is set to be smaller than that between the outer surface of the second journal 12 and the inner surface of the second bearing 42, the oil leakage amount from the first journal 11 is suppressed at a small value. Accordingly, the lubricating oil from the oil pump is sufficiently supplied to the second journal 12 even if being supplied to the first journal 11, that is, the rich lubrication of the second journal 12 is smoothly carried out and lessens troubles in the second journal such as a seize.

With this arrangement, the inner diameter of the insert portion of the cylinder block is formed larger than the diameter of the balance shaft, the diameter of the first journal is formed smaller than the diameter of the second journal near which the unblance portions are located, and the first journal of the balance shaft is supported to the retainer which is detachable from the cylinder block. Accordingly, the first and second bearings can be adequately designed and the friction loss of the bearings are largely reduced.

What is claimed is:

1. A balancer device in combination with an in-line engine, said balancer device comprising:
   a balance shaft rotated according to the rotation of a crankshaft of the engine, said balance shaft including a first journal portion, a second journal portion and an unbalance portion, the first journal portion being located in a vicinity of one end of the engine, the unbalance portion disposed in a vicinity of the second journal portion, the first journal portion being smaller in diameter than the second journal portion;

means defining a balance shaft inserting hole which is formed at one end of a cylinder block of the engine and through which said balance shaft is inserted and installed to the engine, said balance shaft inserting hole having a diameter which is larger than a maximum diameter of said balance shaft;

a fixing member inserted in said balance shaft inserting hole and fixedly secured to the cylinder block to restrict a sliding movement of said balance shaft in an axial direction;

a first bearing portion rotatably supporting the first journal portion, said first bearing portion being set to said fixing member; and a second bearing portion rotatably supporting the second journal portion, said second bearing portion being set to the cylinder block.

2. A balancer device as claimed in claim 1, wherein a clearance between an outer surface of the first journal and an inner surface of the first bearing is smaller than that between an outer surface of the second journal and an inner surface of the second bearing.

3. A balancer device as claimed in claim 1, wherein said balance shaft is set to the cylinder block by being inserted from an axial end portion of the engine.

4. A balancer device as claimed in claim 1, further comprising a sprocket which is connected to a top end portion of said balance shaft and transmits a rotating energy of the crankshaft to said balance shaft.

5. A balancer device as claimed in claim 1, wherein said balance shaft is rotated at twice a rotating speed of the crankshaft.

6. A balance shaft in combination with an internal combustion engine, said balance shaft being set to a cylinder block of the engine by being inserted from an inserting hole which is formed at an axial end portion of the engine, said balance shaft comprising:

a first journal disposed in a vicinity of the inserting hole, said first journal having a diameter which is smaller than a diameter of the inserting hole;

a second journal disposed to a generally center portion in an axial direction of the engine, a diameter of said second journal being greater than that of said first hournal and smaller than that of the inserting hole; and an unbalance portion disposed in a vicinity of said second journal, twice a diameter of said unbalance portion being smaller than the diameter of the inserting hole.

* * * * *